United States Patent [19]

Seino et al.

[11] 4,133,924

[45] Jan. 9, 1979

[54] HEAT SHRINKABLE LAMINATE FILM

[75] Inventors: Koichi Seino, Chigasaki; Hiroshi Omura, Hiratsuka; Takayuki Hinuma, Chigasaki; Jyuzo Hirota, Hiratsuka, all of Japan

[73] Assignee: Mitsubishi Plastics Industries Limited, Tokyo, Japan

[21] Appl. No.: 833,069

[22] Filed: Sep. 14, 1977

[30] Foreign Application Priority Data

Mar. 16, 1977 [JP] Japan .................................. 52/29099

[51] Int. Cl.$^2$ ...................... B32B 15/08; B32B 27/30; B32B 27/36

[52] U.S. Cl. ...................................... 428/164; 156/85; 426/412; 428/181; 428/213; 428/458; 428/463; 428/484; 428/910

[58] Field of Search .................... 156/86, 85; 428/910, 428/164, 209, 484, 181, 212, 213, 458, 461, 463; 426/412

[56] References Cited

U.S. PATENT DOCUMENTS

| | | | |
|---|---|---|---|
| 2,966,439 | 12/1960 | Sorel | 428/514 |
| 3,390,704 | 7/1968 | Woodell | 138/143 |
| 3,443,980 | 5/1969 | McBride | 428/910 X |
| 3,455,720 | 7/1969 | Davies et al. | 428/910 X |
| 3,501,363 | 3/1970 | Kirkpatrick | 428/463 X |
| 3,510,388 | 5/1970 | Hunt et al. | 428/164 |
| 3,547,768 | 12/1970 | Layne | 428/336 |
| 3,669,824 | 6/1972 | Hess | 428/212 |
| 4,064,296 | 12/1977 | Bornstein et al. | 426/412 X |

Primary Examiner—Harold Ansher
Attorney, Agent, or Firm—Oblon, Fisher, Spivak, McClelland & Maier

[57] ABSTRACT

A heat shrinkable film is laminated on a film having less heat shrinkage which can be a metal coated film with an adhesive composition having a relatively low shear strength. The heat shrinkable laminate film forms creases by heat shrinking it.

20 Claims, 5 Drawing Figures (a)

(b)

(c)

(d)

(e)

(f)

HEAT SHRINKABLE LAMINATE FILM

BACKGROUND OF THE INVENTION

1. Field of the Invention

The present invention relates to a heat shrinkable laminate film which forms creases or crepes by heat shrinking it.

2. Description of the Prior Arts

In packages of various articles such as a cap seal of a wine bottle, a foil made of tin or aluminum has been used to impart suitable metallic luster and suitable creases or crepes. However, the processing for forming creases and crepes has not been easy and a new kind of package has been required.

SUMMARY OF THE INVENTION

It is an object of the present invention to provide a heat shrinkable film which has excellent metallic luster and forms suitable creases or crepe.

It is another object of the present invention to provide a heat shrinkable film which easily form suitable creases or crepe by simple processing.

DETAILED DESCRIPTION OF THE PREFERRED EMBODIMENTS

Figure 1:
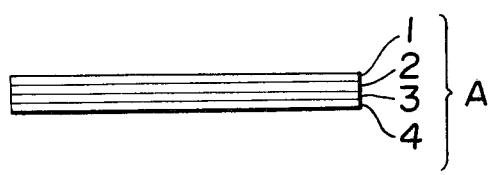
FIG. 1 is a sectional view of a heat shrinkable film of the present invention.

In one embodiment, a heat shrinkable synthetic resin film having high heat shrinkability which is prepared by uniaxially or biaxially stretching a synthetic resin film (hereinafter referred to as heat shrinkable film) is used. A metal coated film prepared by sputtering a metal such as aluminum on a synthetic resin film having higher heat resistant temperature is laminated on one or both surfaces of the heat shrinkable film with an adhesive composition.

In another embodiment, a heat shrinkable laminate film is prepared by laminating a heat shrinkable film on a synthetic resin film having low heat shrinkage with an adhesive composition and both ends of the heat shrinkable laminate film are bonded to form a cylindrical film. The cylindrical film is fitted on an article and is shrunk by heating it whereby creases or crepes are formed to obtain a package covered with a film having creases or crepes.

When the heat shrinkable laminate film is heated at the temperature for imparting shrinkage of the heat shrinkable film prepared by uniaxial or biaxial stretching (hereinafter referred to as heat shrinking temperature), the heat shrinkable film is shrunk to cause slight slip-off between the adhered surfaces by the shrinkage whereby the synthetic resin film having lower heat shrinkage (hereinafter referred to as low shrink film) creases and the crepe is formed on the laminate film itself. The reason why the laminate film has these characteristics is considered as follows.

(a) The film having high heat shrinkage at relatively low temperature is used as the heat shrinkable film for the base of the laminate film. The low shrink film is a film having lower heat shrinkage in comparison with the heat shrinkable film.

(b) An adhesive composition having relatively weak adhesive strength is used for laminating the heat shrinkable film to a low shrink film whereby the heat shrinkage of the heat shrinkable film is not inhibited by the low shrink film.

The heat shrinkable film preferably is characterized by a relatively low heat shrinking temperature, and imparts high shrinkage to the laminate for a short time to cause slip-off between the adhered surfaces.

In general, the heat shrinkable film can be prepared by uniaxially or biaxially stretching a resin film made of polyvinyl chloride. polyethyleneterephthalate, polypropylene etc. is preferably used.

The low shrink film is a film having less or no heat shrinkage at the heat shrinking temperature for the heat shrinkable film. That is, the film having lower heat shrinkage is preferably used. The film can be made of said synthetic resins.

It is especially preferable to use the low shrink film having a bending resistant weight of 0.5 to 10 g in ASTM D 2923 since the random creases and crepes can be uniformly formed and excellent appearance can be given by heat-shrinking the laminate film. When the laminate film is used for a cap seal, the bending of the top part of the cap seal can be easily attained to improve the close contact of the laminate film with a bottle cap.

The adhesive compositions used for laminating the heat shrinkable film and the low shrink film can be solvent type compositions, hot melt type compositions and emulsion type compositions of polymers such as rubbers, acrylic type polymers, ethylenevinylacetate copolymers, vinylchloride-vinylacetate copolymers and isocyanate type polymers. From the viewpoint of the formation of creases or crepes, it is preferable to use an adhesive composition having low cohesive force and high melt flowability, that is, the adhesive composition imparting enough adhesive strength at room temperature and having low adhesive strength at elevated temperature.

It is especially preferable to use an adhesive composition having a shear adhesive strength of less than 3.5 kg/15 mm width at 60° C. preferably 2.7 to 0.8 kg/15 mm width at 60° C. and 1.2 to 0.4 kg/15 mm width at 80° C.

The adhesive composition is selected depending upon the usages and conditions of the laminate film; kinds of the heat shrinkable film and the low shrink film and the condition of shrinking the laminate film. When the adhesive composition having the shear adhesive strength of about 3.5 kg/15 mm width or higher is used, the edge or whole of the laminate film or the heat shrunk laminate film may be curved disadvantageously.

When the adhesive composition having remarkably low shear adhesive strength such as about 0 kg/15 mm width at 60° C. is used, the handling of the laminate film is troublesome.

It is optimum to use pressure-sensitive adhesive compositions having low cohesive force and high melt flowability.

The typical pressure-sensitive adhesive compositions are prepared by using main components of resins such as vinyl chloride-vinyl acetate copolymers, acrylic resins, vinyl acetate resins, natural rubber, synthetic rubbers e.g., polyisobutylene, butadiene rubbers with tackifiers such as coumarone resins, alkylphenol resins.

The pressure-sensitive adhesive compositions are preferably used because they have low cohesive force whereby the adhesive compositions themselves are deformed in the heat shrinkage.

The shear adhesive strength of the laminate film depends upon the cohesive force of the adhesive composition itself as well as the interfacial adhesive force to the film. Even though a pressure-sensitive adhesive composition having low cohesive force is used, a part of the adhesive composition remains on the film. The shear adhesive strength depends upon the interfacial adhesive force of the adhesive composition and the synthetic resin of the film. The shear adhesive strength may be remarkably decreased by coating a parting agent such as a silicone on the surface of the film.

Usually, it is not suitable to coat the parting agent so as to decrease the adhesive composition, but it is suitable to use the pressure-sensitive adhesive composition, since the shear adhesive strength can be maintained after the heat shrinkage.

In order to select a desired adhesive composition, it is easy to find it by a simple test bonding the films with the adhesive composition. The shear adhesive strength can be controlled by selecting a resin or adding an additive. These resins and additives are disclosed in prior art publications on adhesive compositions, for example, (1) "Adhesion and Adhesives" by Bruyne Norman Adrian and Houwink and G. Salomon. (Amsterdam, Flsevier Pub. Co. 1965);
(2) "Reinhold Plastics Application Series: Acrylic resins" page 146 to 148 by Milton B. Horn Catalin Corporation of America;
(3) "Reinhold Plastics Application Series Polyurethanes" page 124 to 133 by Bernard A. Dombrow;
(4) "Treatise on Adhesion and Adhesives" Vol. 2 by Robert L. Patrick;
(5) "Encyclopedia of Polymer Science and Technology" (Interscience) page 445 to 550.

The temperature of 60° C. is about the lowest temperature for imparting shrinkage of the heat shrinkable film and is not the optimum shrinking temperature or the shrinking condition of the laminate film.

The optimum shrinking temperature and the shrinking condition of the laminate film are selected depending upon kinds and amounts of the adhesive compositions and methods of coating them and kinds of the heat shrinkable films and low shrink films.

The coating of the adhesive composition can be attained by the conventional dry laminate system for continuously coating on a whole of the surface and superposing the heat shrinkable film to the low shrink film so as to adhere on the whole of the surface or the gravure roll system for forming the dotted or linear pattern of the adhesive composition on the film and superposing the heat shrinkable film to the low shrink film so as to adhere them.

The former laminate film forms random shaped crease by heat shrinking it. The latter laminate film forms random shaped creases with predetermined patterned crepes.

When the low shrink film coated with metal such as aluminum, tin and silver for ornament is used, the creases having metallic luster of the metal can be imparted.

It has been known that when a heat shrinkable film having metal coat is heat-shrunk, the metal coat layer is damaged and cracked by shrinking the film whereby the whitening is caused and the metallic luster disappears (the temperature at which the metallic luster disappears is referred to as heat resistant temperature).

However, when the laminate film prepared by laminating the heat shrinkable film to the low shrink film having metal coat such as aluminum (metal coated film) is heat shrunk at the optimum shrinking temperature of the heat shrinkable film and lower than the heat resistant temperature of the metal coated film, the metallic luster of the metal coated film is not damaged under forming the creases for the laminate film.

When the laminate film is prepared by laminating the heat shrinkable film having a shrinkage percentage of 40 to 60% at the shrinking temperature to the metal coated film having the heat resistant temperature higher than two times the optimum shrinking temperature with the adhesive composition having relatively low adhesive strength such as 300 to 500 g/25 mm width, and the laminated film is heat shrunk at higher than the optimum shrinking temperature and lower than the heat resistant temperature, the laminate film forms excellent creases or crepes with metallic luster.

However, even though the laminate film is heated at lower than the shrinking temperature (such as ⅔ of the optimum shrinking temperature), the heat shrinkable film does not shrink enough and the shrinkage of the film is prevented by the metal coated film and the adhesive composition and only curl of the laminate film is caused.

When the laminate film is heated at higher than the heat resistant temperature (such as 10 to 20% higher than the heat resistant temperature), the metal coated film highly shrinks to cause the damage and crackings of the metal coated layer and the whitening is caused, to lose the metallic luster.

The time for heating it is also an important factor for the heat shrinkage of the laminate film. When the time for heating is remarkably short, even though the temperature is higher than the heat resistant temperature, excellent creases can be formed without losing the metallic luster. Thus, the condition for the heat treatment should be selected depending upon kinds of heat shrinkable film, the metal coated film and the adhesive composition.

The lamination of the metal coated film can be attained on one or both of the surfaces of the heat shrinkable film. Either of the metal coat surface or the non-metal coat surface can be adhered. In order to give beautiful appearance, it is preferable to adhere the non-metal coat layer.

As described above, the laminate film of the present invention can form excellent creases or crepes by heat shrinking it without any special apparatus. The shape of the laminate film is flat before the heat shrinking, and accordingly, the laminate film can be shaped in suitable shape for the usuages such as cylindrical or bag type packages, plates having creases in a snail shape and other ornaments articles and buffering materials.

In the other embodiments, both edges of the laminate film are bonded to form a cylindrical shape so as to fit on the package. After fitting the cylindrical laminate film on the package, the laminated film is heat shrunk at the optimum shrinking temperature of the heat shrinkable film.

Either of theheat shrinkable film or the low shrink film can be disposed at the outer surface in the preparation of the package. When the low shrink film is disposed at the outer surface, the heat shrunk film precisely covers the surfce of the package and the departing feeling is not found and the creases or crepes are formed on the outer surface so as to attain three dimensional appearance and beautiful appearance.

When the heat shrinkable film is printed, the printed pattern is clearly appeared.

On the other hand, when the heat shrinkable film is disposed at the outer surface, the resulting creases attain the function of buffering material so as to protect the package.

Moreover, the printed pattern is given on the flat heat shrunk film. In the latter case, the difference of the size of the heat shrunk film to that of the inner low shrink film may be caused by the shrinkage of the outer film to appear the adhesive composition layer.

The application of the laminate film for wrapping a tap of bottle top will be shown in the following examples. Thus, the laminate film can be applied on the body of a bottle as a label or a decoration.

In the other embodiment, the crepes in dotted or linear pattern are formed by causing the decrease of adhesive strength or the deformation of higher than elastic limitation at parts. The crepes can be formed by applying tensile stress or compressive stress of higher than elastic limit to the heat shrinkable film by the cold working of the heat shrinkable film.

In the bonded inter-surfaces between the low shrink film and the heat shrinkable film at the parts forming crepes in linear or dotted pattern, the adhesive strength at the parts is decreased to slip out at earlier than that of the other parts and the deformation at higher than the elastic limit is caused because of the broken inner surface and the thinner adhesive composition layer at the parts whereby the creases or the crepes in desired pattern can be formed at the parts.

When the laminate film having no crepe pattern is heat shrunk, the random creases or crepes are formed. However, when the laminate film having crepe pattern is heat shrunk, the creases or crepes in predetermined pattern can be formed.

In the formation of the crepes in desirable pattern, the adhesive strength at the inter-surfaces is partially decreased or the tensile stress or compressive stress of higher than the elastic limit is applied to the heat shrinkable film or the laminated film in desired pattern. From the viewpoints of laminating and pattern forming operations, it is preferable to process the laminate film.

The patterns of the crepes can be selected depending upon the purpose of the application of the laminate film and can be various patterns such as wave curves, rhombic shape, rectangular shape, elliptical shape, circular shape and a combination with dots etc..

The patterns can be formed by pressing with a pattern forming rods or plate, the laminate film or the heat shrinkable film which is moved.

Figure 5:
FIG. 5 shows sectional views of crepes.
Figure 5:
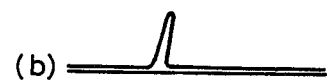
Figure 5:
Figure 5:
Figure 5:
Figure 5:

The crepes formed by heat treatment after forming a desired pattern can be various forms of the shrunk patterns having the sectional views such as pleats, gathers, as shown in FIG. 5. The crepes can be pressed to bend the projected parts.

The present invention will be further illustrated by certain examples.

EXAMPLE 1

A heat shrinkable polyvinyl chloride film (PVC-S) having a thickness of 70$\mu$ prepared by uniaxial stretching was laminated on one surface of a biaxial stretched polyethyleneterephthalate film (PET) having a thickness of 12$\mu$ and a shrinkage percentage of 2.5 to 6% at 200 to 220° C. to obtain a laminate film (PET/PVC-S). The shrinking force of PVC-S film was 40 Kg/cm$^2$ and the temperature for imparting the shrinkage percentage of 50% to perpendicular to the stretching direction (hereinafter referring to as V direction) was 95 to 100° C.

The lamination was carried out by a dry laminate method using a polyurethane type adhesive composition.

The shear adhesive strength was 3.1 Kg/15 mm width at 60° C. and 1.6 Kg/15 mm width at 80° C.

When the PET/PVC-S film was heat-shrunk at 200° C. for 15 seconds, many fine and short creases in the V direction were formed as shown in Table 1.

EXAMPLE 2

A metal coated film was prepared by sputtering of aluminum in a thickness of about 0.1$\mu$ on one surface of a biaxial stretched polyethyleneterephthalate film (PET) having a thickness of 12$\mu$. The PET film had the heat resistant temperature of 200 to 220° C. and the shrinkage percentage of 2.5 to 6% in the stretching direction (P direction).

A uniaxial stretched heat shrinkable polyvinyl chloride film (PVC-S) having a thickness of 70$\mu$ was laminated on the non-metal coat surface of the PET film to obtain the laminate film (PET/PVC-S) of the present invention. The PVC-S film had the shrinking force of 40 Kg/cm$^2$ and the temperature for imparting the shrinkage percentage of 50% to the V direction was 95 to 100° C.

The lamination was carried out by a dry laminate method using a polyurethane type adhesive composition.

The shear adhesive strength was 2.1 Kg/15 mm width at 60° C. and 1.1 Kg/15 mm width at 80° C.

When the PET/PVC-S film was heat-shrunk at 200° C. for 15 seconds, many fine creases in the V direction were formed and the aluminum luster was remained to give excellent appearance as shown in Table 1.

EXAMPLE 3

The heat shrinkable PVC-S film of Example 2 was laminated on the non-metal coat surface of the metal coat PET film of Example 2 with the polyurethane type adhesive composition to obtain the PET/PVC-S film of the present invention which had the shear adhesive strength of 1.9 Kg/15 mm width at 60° C. and 0.9 Kg/15 mm width at 80° C.

When the PET/PVC-S film was heat-shrunk at 200° C. for 15 seconds, many fine creases in the V direction were formed and the aluminum luster was remained to give excellent appearance as shown in Table 1.

EXAMPLE 4

The heat shrinkable PVC-S film of Example 2 was laminated on the non-metal coat surface of the metal coat PET film of Example 2 with the acrylic type adhesive composition to obtain the PET/PVC-S film of the present invention which had the shear adhesive strength of 1.4 Kg/15 mm width at 60° C. and 0.5 Kg/15 mm width at 80° C.

When the PET/PVC-S film was heat-shrunk at 200° C. for 15 seconds, many fine creases in the V direction were formed and the aluminum luster was remained to give excellent appearance as shown in Table 1.

EXAMPLE 5

The laminate film of Example 4 was used for preparing a cap seal by cutting the laminate film in a size of a height of about 50 mm and a width of about 90 mm and bonding the edges of the piece with a polyurethane type adhesive composition with an overlapped width of 5 mm to form a cylindrical cap seal having a diameter of about 30 mm which is slightly larger than the bottle head. In the cap seal, the heat shrinkable film was disposed inside and the metal coat film was disposed outside and the direction of shrinkage was circumferencial direction.

When the cap seal was fitted on the bottle top and was heat-shrunk at 200° C. for 15 seconds, many fine creases in the V direction were formed and the aluminum luster was remained and no curl was formed at the edge to give excellent appearance.

EXAMPLE 6

The heat shrinkable PVC-S film of Example 2 was laminated on the non-metal coat surface of the metal coat PET film of Example 2 with the acrylic type adhesive composition to obtain the PET/PVC-S film of the present invention which had the shear adhesive strength of 1.9 Kg/15 mm width at 60° C. and 0.7 Kg/15 mm with at 80° C.

When the PET/PVC-S film was heat-shrunk at 200° C. for 15 seconds, many creases in the V direction were formed and the aluminum luster was remained to give excellent appearance as shown in Table 1.

EXAMPLE 7

In accordance with the process of Example 5 except using the laminate film of Example 6, the cylindrical cap seal having a height of about 50 mm and a diameter of about 30 mm was prepared. When the cap seal was fitted on the bottle top and was heat-shrunk at 200° C. for 15 seconds, many fine creases in the V direction were formed and the aluminum luster was remained and no curl was formed at the edge to give excellent appearance.

EXAMPLE 8

A metal coat film was prepared by sputtering of aluminum in a thickness of about 0.1µ on one surface of a biaxial stretched polyethyleneterephthalate film (PET) having a thickness of 6µ. The PET film had the heat resistant temperature of 200 to 220° C. and the shrinkage percentage of 2.5 to 6% in the P direction.

The heat shrinkable PVC-S film of Example 2 was laminated on the non-metal coat surface of the metal coat PET film with an acrylic type adhesive composition to obtain a laminate film which had the shear adhesive strength of 1.9 Kg/15 mm width at 60° C. and 0.7 Kg/15 mm with at 80° C.

When the PET/PVC-S film was heat-shrunk at 200° C. for 15 seconds, many creases in the V direction were formed and the aluminum luster was remained to give excellent appearance.

EXAMPLE 9

The heat shrinkable PVC-S film of Example 2 was laminated on the non-metal coat surface of the metal coat PET film of Example 2 with the acrylic type adhesive composition to obtain the PET/PVC-S film of the present invention which had the shear adhesive strength of 0.6 Kg/15 mm width at 60° C. and 0.3 Kg/15 mm width at 80° C.

In accordance with the process of Example 5 except using the resulting laminate film, the cylindrical cap seal having a height of about 50 mm and a diameter of about 30 mm was prepared. When the cap seal was fitted on the bottle top and was heat-shrunk at 200° C. for 15 seconds, many fine creases in the V direction were formed and the aluminum luster was remained and no curl was formed at the edge to give excellent appearance though slight partial peeling phenomenon was found.

Table 1

| Exp. | Structure of laminate film | Type of adhesive comp. | Adhesive strength (Kg/15mm width) | Appearance Creases | Metallic luster |
|---|---|---|---|---|---|
| 1 | 12µ 70µ PET/PVC-S | polyurethane type | 3.1 (60° C) 1.6 (80° C) | fine short many creases | |
| 2 | 12 70 PET/PVC-S | " | 2.1 (60° C) 1.1 (80° C) | fine many creases | Al luster |
| 3 | " | " | 1.9 (60° C) 0.9 (80° C) | " | " |
| 4 | " | acrylic type | 1.4 (60° C) 0.5 (80° C) | many creases | " |
| 5 | " (cap seal) | " | " | many creases no curl | " |
| 6 | " | " | 1.9 (60° C) 0.7 (80° C) | many creases | " |
| 7 | " (cap seal) | " | " | many creases no curl | " |
| 8 | 6µ 70µ PET/PVC-S | " | 1.9 (60° C) 0.7 (80° C) | fine many creases | " |
| 9 | 12µ 70µ PET/PVC-S (cap seal) | polyurethane type | 0.6 (60° C) 0.3 (80° C) | fine many crease no curl peeling | " |

Note:
Shear adhesive strength:
Both edges of two sheets of the sample having a width of 15 mm and a length of 60 mm were overlapped with a width of 5 mm to adhere them and the samples were pulled off at a velocity of 100 mm/min. to measure the shear adhesive strength.

EXAMPLE 10

A heat shrinkable polyvinyl chloride film (PVC-S) having a thickness of 70µ prepared by uniaxial stretching was laminated on one surface of a biaxial stretched polyethyleneterephthalate film (PET) having a thickness of 12µ and a shrinkage percentage of 2.5 to 6% at 200 to 220° C. to obtain a laminate film (PET/PVC-S). The shrinking force of PVC-S film was 40 Kg/cm$^2$ and the temperature for imparting the shrinkage percentage of 50% to perpendicular to the stretching direction was 95 to 100° C.

The lamination was carried out with an acrylic type adhesive composition.

A fold was formed on the PET/PVC-S film and the film was disposed on a compressing anvil made of aluminum having a width of 4 mm, a length of 100 mm and a height of 100 mm to place the fold at the center of the anvil. The PET/PVC-S film was pressed at room temperature under the pressure of 3 Kg to form linear crepes to prepare the laminate film having the crepes.

The adhesive strength (T peeling strength) of the film was 1.2 Kg/25 mm width at the part of no crepe and about 1 Kg/25 mm width (15% lower) at the part pressed under the pressure of 3 Kg.

When the laminate film having crepes was heat-shrunk at 200° C. for 15 seconds, the random creases were slightly found at the part of no fold and the crepes were also found at the parts of fold pattern.

As the reference, the pressure of 0.5 Kg was applied to the PET/PVC-S film instead of 3.0 Kg, and the film was heat-shrunk. Only random creases were found but no crepe was found at the part of fold pattern. The adhesive strength (T peeling strength) of the PET/PVC-S film was 1.1 Kg/25 mm width.

EXAMPLE 11

A metal coated film was prepared by sputtering of aluminum in a thickness of about 0.1μ on one surface of a biaxial stretched polyethyleneterephthalate film (PET) having a thickness of 12μ. The PET film had the heat resistant temperature of 200 to 220° C. and the shrinkage percentage of 2.5 to 6% in the stretching direction.

A uniaxial stretched heat shrinkable polyvinyl chloride film (PVC-S) having a thickness of 70μ was laminated on the non-metal coal surface of the PET film to obtain the laminate film (PET/PVC-S) which had the shrinking force of 40 Kg/cm$^2$ and the temperature for imparting the shrinkage percentage of 50% to the perpendicular to the stretching direction was 95 to 100° C.

The PET/PVC-S film was pressed with a rod having spherical surface (0.5 R) under the pressure of 1 Kg at room temperature and the film was moved to form linear crepe on the laminate film.

The adhesive strength (T peeling strength) of the film was 1.2 Kg/25 mm width at the part of no crepe and 1 Kg/25 mm width (15% lower) at the part pressed under the pressure of 1 Kg.

When the laminate film having crepes was heat-shrunk at 200° C. for 15 seconds, the random creases were slightly found at the part of no pressure and the linear crepes were found at the part pressed. The aluminum luster was remained to give excellent appearance.

As the reference, the pressure of 0.3 Kg was applied to the PET/PVC-S film instead of 1 Kg and the film was heat-shrunk. Only random creases were found but no crepe was found at the part of linear pattern. The adhesive strength (T peeling strength) of the PET/PVC-S film was 1.1 Kg/25 mm.

EXAMPLE 12

A metal coat film was prepared by sputtering of aluminum (2) in a thickness of about 0.02 to 0.04μ on a biaxial stretched polyethyleneterephthalate film (PET) having a thickness of 12μ (1). The film had the heat resistant temperature of 200 to 220° C. and the shrinkage percentage of 2.5 to 6% in the stretching direction.

A heat shrinkable polyvinyl chloride film (PVC-S) having a thickness (4) prepared by uniaxial stretching was laminated on a whole of the metal coat surface of the metal coat film with an adhesive composition (3) to obtain a laminate film (FIG. 1). The PVC-S film had shrinking force of 40 Kg/cm$^2$ and the temperature for imparting the shrinkage percentage of 50 to 60% to perpendicular to the stretching direction was 95 to 100° C. The lamination was carried out by using the acrylic type adhesive composition (3) (SK dine-100 manufactured by Soken Kagaku K.K.) by a dry-laminate method using a Mayer bar coater. The adhesive strength was about 500 g/25 mm width.

Figure 2:
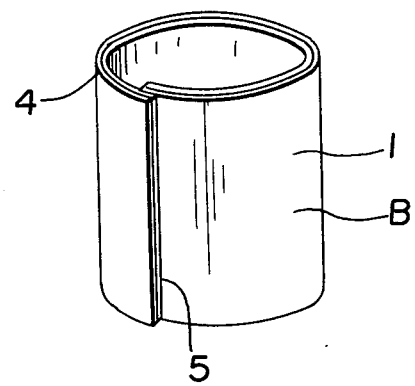
FIG. 2 is a schematic view of a cylindrical cap seal prepared by using a heat shrinkable laminate film.

The laminated film was cut in a size of a height of 50 mm and a width of 100 mm and both edges (5) were bonded with an adhesive composition (Adcoat 503-35 J type manufactured by Toyo Moton K.K.) to prepare a cylindrical cap seal B having a diameter of about 30 mm which is slightly larger than the bottle head C. The cap seal B had the heat shrinkable film (4) inside and the metal coat film (1) outside and the shrinking direction is circumferencial direction (FIG. 2).

Figure 3:
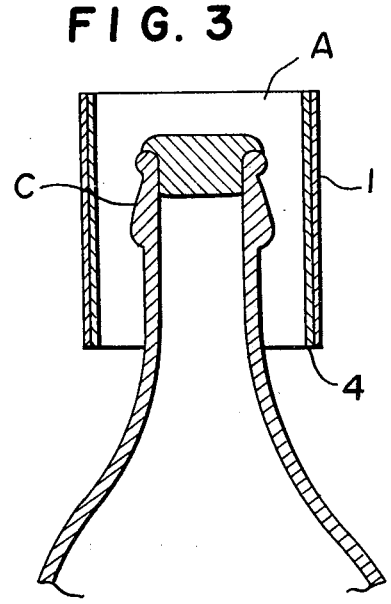
FIG. 3 is a sectional view of a bottle and the cylindrical cap seal of FIG. 2.
Figure 4:
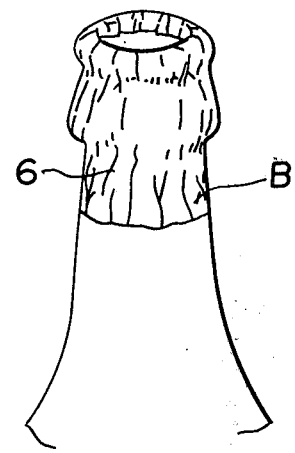
FIG. 4 is a schematic view of a bottle sealed with a cylindrical cap seal.

The cap seal B was fitted on the bottle head C (FIG. 3) and it was heat shrunk at about 100° C. for 60 seconds. The aluminum luster was remained and random creases (6) in wide width in the shrinking direction were formed to give excellent appearance (FIG. 4).

What is claimed is:

1. A heat shrinkable laminate film which comprises a heat shrinkable synthetic resin film and a low shrink film which forms creases or crepes when said laminate is heat shrunk, and which is lamimated on the heat shrinkable film with an adhesive composition having low cohesive force and high melt flowability and an adhesive strength lower than the shrinking force of the heat shrinkable film.

2. A heat shrinkable laminate film according to claim 1 wherein said adhesive composition has a shear adhesive strength of less than 3.5 Kg/15 mm width at 60° C.

3. A heat shrinkable laminate film according to claim 1 wherein said adhesive composition has a shear adhesive strength of 2.7 to 0.8 Kg/15 mm width at 60° C. and 1.2 to 0.4 Kg/15 mm width at 80° C.

4. A heat shrinkable laminate film according to claim 1 wherein said heat shrinkable film or said laminate film is pressed to form crepe pattern before the heat shrinking operation.

5. The heat shrinkable laminate film of claim 1, wherein said low shrink film has a bending resistant weight of 0.5 to 10 g, according to ASTM D2923.

6. The heat shrinkable laminate film of claim 1, wherein said adhesive composition is an emulsion type composition which is selected from the group consisting of acrylic type polymers, ethylene-vinyl acetate copolymers, vinyl chloride-vinyl acetate copolymers and isocyanate type polymers.

7. The heat shrinkable laminate film of claim 1, wherein said adhesive composition is a pressure sensitive adhesive composition which comprises at least one resin component selected from the group consisting of acrylic resins, vinyl acetate resins, natural rubber and synthetic rubbers, and at least one tackifier selected from the group consisting of coumarone resins and alkylphenol resins.

8. The heat shrinkable laminate film of claim 1, wherein said adhesive composition is applied to the entire surface of one of said heat shrinkable synthetic resin film or said low shrink film, to which adhesive layer the other film is laminated.

9. The heat shrinkable laminate film of claim 1, wherein said adhesive composition is applied in a discontinuous pattern to one of said heat shrinkable synthetic resin film or said low shrink film, to which adhesive coated film the other film is laminated; such that said laminate forms patterned crepes when heat shrunk.

10. The heat shrinkable laminate film of claim 1, wherein said heat shrinkable synthetic resin film is one of a uniaxially or biaxially stretched resin film selected from the group consisting of polyvinyl chloride film, polyethylene terephthalate film and polypropylene film.

11. A heat shrinkable laminate film according to claim 1 wherein said low shrink film is a metal coated film.

12. The heat shrinkable laminate film of claim 11, wherein said metal coated film is metallized by sputtering.

13. The heat shrinkable laminate film of claim 2, wherein said heat shrinkable film has a shrinkage percentage of 40 to 60% at the optimum shrinking temperature, said metal coated film has a heat resistant temperature higher than two times said optimum shrinking temperature, and said adhesive composition has an adhesive strength of from 300 to 500 g/25 mm width at said optimum shrinking temperature.

14. A cap seal which is formed by forming and bonding the heat shrinkable laminate film of claim 13 into a cylindrical shape, fitting said shape on a bottle head, and heat shrinking said heat shrinkable laminate film at a temperature above said optimum heat shrinking temperature but below said heat resistant temperature.

15. The heat shrinkable laminate film of claim 13, wherein said heat shrinkable film is a uniaxially stretched polyvinyl chloride film having a shrinking force of 40 kg/cm$^2$ and a 50% shrinkage in the direction perpendicular to the stretching direction at 95°–100° C; said low shrink film is a biaxially stretched polyethylene terephthalate film one surface of which is coated with aluminum in a thickness of about 0.1$\mu$ and having a heat resistant temperature of 200°–220° C. and a shrinkage percentage of 2.5–6% in the stretching direction.

16. The heat shrinkable laminate film of claim 15, wherein said adhesive composition is a polyurethane type adhesive having a shear adhesive strength of 1.9 Kg/15 mm width at 60° C. and 0.9 Kg/15 mm width at 80° C.

17. The heat shrinkable laminate film of claim 15, wherein said adhesive composition is an acrylic type adhesive having a shear adhesive strength of 1.9 Kg/15 mm width at 60° C. and 0.7 Kg/15 mm width at 80° C.

18. A heat shrinkable laminate film according to claim 1 wherein said heat shrinkable laminate film is bonded to form a cylindrical shape, fitted on a bottle head, and heat shrunk.

19. A cap seal which is formed by said heat shrinkable laminate film according to claim 18.

20. A cap seal which is formed by said heat shrinkable laminate film according to claim 18 wherein said adhesive composition has a shear adhesive strength of less than 3.5 kg/15 mm width at 60° C.

* * * * *